(12) United States Patent
Ottenheijm

(10) Patent No.: US 7,452,934 B2
(45) Date of Patent: Nov. 18, 2008

(54) FLAME RETARDANT POLYAMIDE COMPOSITION

(75) Inventor: Johannes H. G. Ottenheijm, Born (NL)

(73) Assignee: DSM IP Assets B.V., Heerlen (NL)

( * ) Notice: Subject to any disclaimer, the term of this patent is extended or adjusted under 35 U.S.C. 154(b) by 490 days.

(21) Appl. No.: 10/557,210

(22) PCT Filed: May 14, 2004

(86) PCT No.: PCT/NL2004/000370

§ 371 (c)(1),
(2), (4) Date: Jan. 19, 2006

(87) PCT Pub. No.: WO2004/111127

PCT Pub. Date: Dec. 23, 2004

(65) Prior Publication Data

US 2006/0235125 A1    Oct. 19, 2006

(30) Foreign Application Priority Data

May 22, 2003    (EP) ................................ 03076560

(51) Int. Cl.
C08K 3/22    (2006.01)
C08K 3/24    (2006.01)
C08K 5/03    (2006.01)

(52) U.S. Cl. ...................... 524/411; 524/409; 524/410; 524/469

(58) Field of Classification Search ......... 524/409–411, 524/469
See application file for complete search history.

(56) References Cited

U.S. PATENT DOCUMENTS

| 6,441,072 | B1 | 8/2002 | Havenith et al. |
| 2002/0134771 | A1 | 9/2002 | Wenger et al. |
| 2003/0055152 | A1 | 3/2003 | Ottenheijm |

FOREIGN PATENT DOCUMENTS

| EP | 0 172 259 | 2/1986 |
| EP | 0 999 235 | 5/2000 |
| EP | 1 288 260 | 3/2003 |

OTHER PUBLICATIONS

International Search Report.

*Primary Examiner*—Peter Szekely
(74) *Attorney, Agent, or Firm*—Nixon & Vanderhye, PC

(57) ABSTRACT

The invention relates to a flame retardant polyamide composition, comprising a polyamide polymer, a polyamide prepolymer, a halogen containing flame retardant, and an antimony containing synergist having a low lead content. The composition shows surprisingly improved mechanical properties. The invention also relates to a process for preparing the flame retardant polyamide composition, use the flame retardant polyamide composition for preparing moulded parts and to a moulded part obtainable from the flame retardant polyamide composition.

13 Claims, No Drawings

FLAME RETARDANT POLYAMIDE COMPOSITION

This application is the US national phase of application PCT/NL2004/000370 filed 14 May 2004 which designated the U.S. and claims benefit of EP 03076560.6, dated 22 May 2003, the entire content of which is hereby incorporated by reference.

The invention relates to a flame retardant polyamide composition, comprising a polyamide polymer, a polyamide prepolymer and a halogen containing flame retardant. The invention also relates to a process for preparing the flame retardant polyamide composition, the use thereof and to a moulded part obtainable from the flame retardant polyamide composition.

Such a composition is known from EP-A-0957131. EP-A-0957131 describes polyamide compositions comprising a polyamide polymer and a polyamide prepolymer, in which the polyamide prepolymer has a solution viscosity η-rel 1.01-1.30 (measured in 0.5 mass % solution in m-cresol). The prepolymer is used to improve the flow properties and surface characteristics of the polyamide compositions. These polyamide prepolymer containing compositions generally have a reduced elongation at break compared to corresponding compositions without polyamide prepolymer, which effect of reduced elongation is enhanced at higher prepolymer content. The compositions according EP-A-0957131 may also contain a filler, which filler may be a flame retardant, such as a halogen containing substance. Halogen containing flame retardants are widely used in flame retardant polyamides and are generally used in combination with a synergist, such as an antimony containing synergist (A. El Sayed in Becker/Braun Kunststoff Handbuch ¾ Polyamide, Hanser Verlag, Munchen, ISBN 3-446-16486-3, (1998) page 94-95). A disadvantage of flame retardant polyamide compositions based on halogen containing flame retardants is that the mechanical properties, such as tensile strength and elongation at break, are deteriorated by the antimony containing synergist. The reduction in elongation is enhanced when the composition also comprises a polyamide prepolymer, and, at higher prepolymer content, also the tensile strength is reduced. Mechanical properties are important in many applications in which flame retardant polyamide composition are used, such as electric and electronic parts. With flame retardant polyamide composition having such reduced mechanical properties these applications become critical if not possible anymore at all.

The object of the invention is therefore to provide a flame retardant polyamide composition comprising an antimony containing synergist in addition to a polyamide polymer, a polyamide prepolymer and a halogen containing flame retardant that shows less reduction in elongation and tensile strength than the known composition comprising an antimony containing synergist.

This object has been achieved by the composition comprising an antimony containing synergist containing less than 250 ppm lead. The composition according to the invention comprising an antimony containing synergist containing less than 250 ppm lead, shows better elongation properties than the known composition comprising a standard grade antimony containing synergist. A further advantage is that the composition according to the invention has a higher tensile strength and notched Izod impact resistance.

In the context of the present invention a polyamide composition is understood to be a composition comprising the total of constituting components in mixed form, and which composition can be used in a moulding process for preparing shaped articles. The polyamide composition may have different forms, for example, but not limited thereto, a dry blend, a melt (for example in an apparatus suitable for preparing moulded parts), extruded strands, and chopped granules. The composition may be formed, for example, by dry blending or by melt-mixing of the constituting components. The composition may also be formed by separately adding the respective constituting components or combinations thereof, to an apparatus suitable for preparing shaped articles.

In the context of the present invention, the ppm values for the lead content in the antimony containing synergist, always are refer to the weight of the lead content relative to the weight of the antimony containing synergist.

In the context of the present invention a polyamide polymer is understood to be a high-molecular polyamide with a weight-average molecular weight of at least 10,000 g/mol, preferably at least 15,000 g/mol, more preferably at least 20,000 g/mol.

A polyamide prepolymer is herein understood to be a low-molecular polyamide with a weight-average molecular weight of at most 7500. Preferably, the weight-average molecular weight is lower than the "molecular weight between entanglements" of the high-molecular polymer. Also preferably the weight average molecular weight of the polyamide prepolymer is at most 5,000 g/mol, more preferably at most 4,000 g/mol, even more preferably at most 3,000 g/mol. The molecular weight of the polyamide prepolymer may not be too low either, to avoid the risk of for example the glass transition temperature being lowered. Preferably the weight-average molecular weight is greater than approximately 1,000 g/mol.

Suitable polyamides, for both the polyamide polymer and the polyamide prepolymer, are all the polyamides known to a person skilled in the art, comprising crystalline, semi-crystalline and amorphous polyamides, and mixtures thereof, which are melt-processable.

Examples of suitable polyamides according to the invention are aliphatic polyamides, for example PA-6, PA-11, PA-12, PA-4,6, PA-4,8, PA-4,10, PA-4,12, PA-6,6, PA-6,9, PA-6,10, PA-6,12, PA-10,10, PA-12,12, PA-6/6,6-copolyamide, PA-6/12-copolyamide, PA-6/11-copolyamide, PA-6,6/11-copolyamide, PA-6,6/12-copolyamide, PA-6/6, 10-copolyamide, PA-6,6/6,10-copolyamide, PA-4,6/6-copolyamide, PA-6/6,6/6,10-terpolyamide, and copolyamides obtained from 1,4-cyclohexanedicarboxylic acid and 2,2,4- and 2,4,4-trimethylhexamethylenediamine, aromatic polyamides, for example PA-6,I, PA-6,I/6,6-copolyamide, PA-6,T, PA-6,T/6-copolyamide, PA-6,T/6,6-copolyamide, PA-6,I/6,T-copolyamide, PA-6,6/6,T/6,I-copolyamide, PA-6,T/2-MPMDT-copolyamide (2-MPMD=2-methylpentamethylene diamine), PA-9,T, PA-9T/2-MOMDT (2-MOMD=2-methyl-1,8-octamethylenediamine), copolyamides obtained from terephthalic acid, 2,2,4- and 2,4,4-trimethylhexamethylenediamine, copolyamide obtained from isophthalic acid, laurinlactam and 3,5-dimethyl-4,4-diamino-dicyclohexylmethane, copolyamides obtained from isophthalic acid, azelaic acid and/or sebacic acid and 4,4-diaminodicyclohexylmethane, copolyamides obtained from caprolactam, isophthalic acid and/or terephthalic acid and 4,4-diaminodicyclohexylmethane, copolyamides obtained from caprolactam, isophthalic acid and/or terephthalic acid and isophoronediamine, copolyamides obtained from isophthalic acid and/or terephthalic acid and/or other aromatic or aliphatic dicarboxylic acids, optionally alkyl-substituted hexamethylenediamine and alkyl-substituted 4,4-diaminodicyclohexylamine, and also copolyamides and mixtures of the aforementioned polyamides.

Preferably polyamides are chosen from the group comprising PA-6, PA-6,6, PA-6,10, PA-4,6, PA-11, PA-12, PA-12,12, PA-6,I, PA-6,T, PA-6,T/6,6-copolyamide, PA-6,T/6-copolyamide, PA-6/6,6-copolyamide, PA-6,6/6,T/6,I-copolyamide, PA-6,T/2-MPMDT-copolyamide, PA-9,T, PA-9T/2-MOMDT-copolyamide, PA-4,6/6-copolyamide and mixtures and copolyamides of the aforementioned polyamides. More preferably PA-6,I, PA-6,T, PA-6,6, PA-6,6/6T, PA-6,6/6,T/6,I-copolyamide, PA-6,T/2-MPMDT-copolyamide, PA-9,T, PA-9T/2-MOMDT-copolyamide or PA-4,6, or a mixture or copolyamide thereof, is chosen as the polyamide.

The polyamide composition according to the invention may comprise one polyamide polymer or more polyamide polymers of the same or different type of polyamide and also the polyamide prepolymer may be of the same type of polyamide as the polyamide polymer or may be of a different type of polyamide.

The polyamide polymer in the composition according to the invention may optionally contain modified end groups, for example amine end groups modified with a mono-carboxylic acid and/or carboxylic acid end groups modified with a mono-functional amine. Modified end-groups in the high molecular weight polyamide polymer may advantageously be applied for improved melt-stability of the composition during its preparation by melt-mixing or during a moulding process of said composition.

The polyamide prepolymer preferably has a melting temperature of at least 260° C., more preferable at least 270° C., even more preferable at least 280° C. The advantage of a polyamide prepolymer with a higher melting temperature, in particular when used in a larger amount, is that the high temperature mechanical properties of the polyamide composition are better retained or even improved A polyamide that is eminently suited for the polyamide prepolymer in the process according to the invention is polyamide-4,6. Polyamide-4,6 prepolymer has a melting temperature of about 290° C. The advantage of polyamide-4,6 prepolymer is that it can be produced on industrial scale and that it can be combined with a wide range of high temperature engineering polyamides.

In the context of this application "PA-4,6" is understood to be a polyamide of which at least 50%, preferably at least 75%, more preferably at least 90%, consists of tetramethyleneadipamide units. PA-4,6 can be prepared through polycondensation of tetramethylenediamine and adipic acid or an adduct thereof, optionally in the presence of other polyamide-forming monomers, for example ε-caprolactam, a different diamine, for example hexamethylenediamine or a different carboxylic acid, for example isophthalic acid or cyclohexanedicarboxylic acid.

The polyamide prepolymer in the composition according to the invention may also optionally contain modified end groups, for example amine end groups modified with a mono-functional carboxylic acid and/or carboxylic acid end groups modified with a mono-functional amine. Mono-functional carboxylic acids and/or mono-functional amines may advantageously be applied during the preparation of the polyamide prepolymer as a chain stopper to control the molecular weight of the polyamide prepolymer. Preferably, the polyamide prepolymer comprises at most 50%, more preferably less than 40%, even more preferably at most 30% and most preferably at most 25%, modified end groups relative to the total number of end groups. The advantage of a polyamide prepolymer with a lower percentage of modified end groups in the process according to the invention is that the mechanical properties of the resulting composition, are further improved.

In the composition according to the invention the polyamide prepolymer is generally present in an amount of 0.5-30 wt. % relative to the total weight of polyamide. Larger amounts of the prepolymer can be used. However, too large amounts may adversely affect the mechanical properties. A person skilled in the art can choose the amount of prepolymer within the given range, or above, depending on the desired properties of the composition. Preferably an amount of 1-25 weight % prepolymer, relative to the total amount of polyamide, is chosen.

More preferably, the amount of polyamide prepolymer is at most 20 weight %, even more preferably at most 15 weight %, relative to the total amount of polyamide, since a lower amount results in better mechanical properties.

Also more preferably, the amount of polyamide prepolymer is at least 2 weight %, even more preferably at least 7 weight %, or even better 12 weight %, relative to the total amount of polyamide, since a higher amount results in a better flow.

A higher amount of polyamide prepolymer is even more advantageously applied in combination with a higher amount of antimony containing synergist. A higher content of antimony containing synergist generally reduces the flowability of the polyamide composition The composition comprising these said components in higher amounts combine the advantageous properties of good flow and increased flame retardancy with retention of the good mechanical properties and outer appearance.

Suitable halogen-containing flame retardants, that can be used in the composition according to the invention are, for example brominated polystyrene, for example Pyrochek® 68PB and Saytex® HP7010, both from Albemarle (USA), brominated polyphenylene ether, for example PO64P® from Great Lakes (USA), polydibromostyrene, for example PDBS80® from Great Lakes, polytribromostyrene, polypentabromostyrene, polydichlorostyrene, polytrichlorostyrene, polypentachlorostyrene, polytribromo-alpha-methylstyrene, polydibromo-p-phenylene oxide, polytribromo-p-phenylene oxide, polydichloro-p-phenylene oxide, polybromo-p-phenylene oxide, polybromo-o-phenylene oxide, pentabromobenzyl acrylate, for example FR1025® from AmeriBrom (USA), ethylene bis-tetrabromo-phtalimide, for example Saytex® BT-93W from Albemarle (USA), polybromobiphenyl, brominated phenoxy- and chlorine-containing flame retardants such as DeChlorane® (Occidental Chemical Corporation, USA) and other brominated compounds such as Saytex® 8010 from Albemarle (USA).

Preferably, the halogen-containing flame retardant is a bromine containing polystyrene. More preferably the bromine containing polystyrene is a polybromostyrene, even more preferably a polybromostyrene with a bromine content of at least 59 wt % relative to the weight of the polybromestyrene The advantage of polybromostyrene with a bromine content of more than 59 wt % relative to the weight of the polybromostyrene is that the composition may comprise a lower amount of flame retardant with retention of flame retardancy properties and with improved mechanical properties.

Suitable antimony containing synergists that can be used in the composition according to the invention are, for example, antimony trioxide, antimony tetraoxide, antimony pentaoxide, antimonytartrate, sodium anitimonate and potassium antimonate and analogous antimony compounds, provided that these synergists have a lead content of less than 250 ppm. Preferably, the antimony containing synergist is chosen from the group consisting of antimony trioxide, antimony pentaoxide, sodium antimonate and potassium antimonate each having a lead content of less than 250 ppm.

Also preferably, the synergist has a lead content of less than 150 ppm, more preferably less than 100 ppm. The advantage of a lower lead content is that the tensile strength and impact resistance of moulded articles made from the composition are better.

In the flame retardant polyamide composition according to the invention the halogen containing flame retardant is generally used in an amount between 1 and 100 parts by weight, relative to a total amount of polyamide of 100 parts by weight.

Preferably, the amount of halogen containing flame retardant is at least 10 parts by weight, more preferably at least 20 parts by weight and most preferably at least 30 parts by weight, relative to the total amount of polyamide of 100 parts by weight. A higher minimum amount of halogen containing flame retardant is advantageously applied in compositions having a higher flame retardancy performance.

Also preferably, the amount of halogen containing flame retardant is at most 90 parts by weight, more preferably at most 85 parts by weight and most preferably at most 80 parts by weight, relative to the total amount of polyamide of 100 parts by weight. A lower maximum amount of halogen containing flame retardant is advantageously applied in compositions having an increased toughness and impact resistance. The optimal amount can in principle be determined experimentally by a person skilled in the art of formulating polyamide compositions through systematic research.

The antimony containing synergist is generally used in an amount between 0.5 and 50 parts by weight (pbw), relative to a total amount of polyamide of 100 parts by weight.

Preferably, the antimony containing synergist is used in an amount corresponding with a weight ratio, relative to the amount of halogen containing flame retardant, of 0.1:1-1:1, more preferably 0.2:1-0.6:1. Also more preferably, the amount is at most 40 pbw, even more preferably 30 pbw, and still more preferably at most 20 pbw, relative to a total amount of polyamide of 100 pbw. The advantage of a lower amount of antimony containing synergist, relative to a total amount of polyamide, is that the composition has a better tensile strength, elongation at break, toughness and impact strength.

In the composition according to the invention, also other flame retardants may be used in combination with the system of halogen containing flame retardant and antimony containing synergist.

Suitable other flame retardants that may be combined with said system are, for example, nitrogen-containing compounds such as guanamine based compounds, melamine based compounds and n-alkanelactam-substituted polymers; nitrogen and phosphorus containing compounds such as ammonium polyphosphate and melamine based phosphorous compounds; and phosphorus-containing compounds such as red phosphorus, phosphazene-based compounds and organic phosphorus compounds.

Preferably, the composition according to the invention comprises an n-alkanelactam-substituted polymer. The advantage of the composition comprising an n-alkanelactam-substituted polymer with the system of halogen containing flame retardant and antimony containing synergist according to the invention is that the amount of synergist can be reduced without the flame retardancy being adversely affected. As an added advantage of the composition according to the invention it was found that dripping according to the UL-94 test (Underwriters Laboratories) could be greatly reduced, in particular in compositions according to the invention that also contain glass fibres. On account of the increasingly stringent requirements that are being imposed with respect to flame-retardant compositions, minimal dripping, preferably the absence of dripping, is most desirable. Another advantage is that discolouration of the composition, which may for example occur during the processing of the composition at high temperatures, can be reduced, for example by reducing the amount of synergist.

Preferably, the n-alkanelactam-substituted polymer is polyvinyl pyrrolidone (PVP).

The composition according to the invention may optionally also comprise other substances that promote the flame retardancy, for example carbon-forming substances such as polyphenylene ether and polycarbonate and substances modifying the dripping behaviour, for example fluoropolymers such as polytetrafluoroethylene.

The composition according to the invention may also contain other additives known to a person skilled in the art that are customarily used in polymer compositions, providing they do not essentially detract from the invention, in particular pigments, processing aids, for example mould release agents, crystallization accelerating agents, nucleating agents, softeners, UV and heat stabilizers, impact modifiers and the like. In particular, the composition according to the invention contains an inorganic filler or reinforcing agent. Suitable for use as reinforcing agent are all the fibrous and plate like fillers known to a person skilled in the art, for example glass fibres, metal fibres, graphite fibres, aramide fibres, glass beads, aluminium silicates, asbestos, mica, clay, calcined clay and talcum. Preferably, glass fibres are chosen.

Generally, the composition according to the invention consists of:
a) 70-99 pbw polyamide polymer,
b) 30-1 pbw polyamide prepolymer, whereby the sum of (a+b) amounts to 100 pbw,
c) 1-100 pbw halogen containing flame retardant,
d) 0.5-50 pbw antimony containing synergist,
e) 0-200 pbw of a reinforcing agent, and
f) 0-100 pbw of at least one other additive.

The invention also relates to a process for preparing the flame retardant polyamide composition. The process according to the invention comprises melt-mixing of a polyamide composition comprising a polyamide polymer having a weight-average molecular weight of at least 10,000 g/mol, a polyamide prepolymer having a weight-average molecular weight of at most 7500, a halogen containing flame retardant and an antimony containing synergist containing less than 250 ppm lead, relative to the antimony containing compound.

Preferred embodiments of the inventive process directly relate to the preferred embodiments of the polyamide compositions according to the invention described above.

The process according to the invention can be carried out in a melt-mixing apparatus, for which any melt-mixing apparatus known to the man skilled in the art of preparing polymer compositions by melt-mixing can be used. Suitable melt-mixing apparatus are, for example, kneaders, Banburry mixers, single-screw extruders and twin-screw extruders. Preferably, use is made of an extruder fitted with means for dosing all the desired components to the extruder, either to the extruder's throat or to the melt.

In the process according to the invention the constituting components for forming the composition are fed to the melt-mixing apparatus and melt-mixed in that apparatus. The constituting components may be fed simultaneously as a powder mixture or granule mixer, also known-as dry-blend, or may be fed separately. Polyamide polymer and polyamide prepolymer may also be fed separately.

Melt-mixing is typically performed at a processing temperature, which is above the melting temperature of the polyamide polymer, thereby forming a polymer melt.

In a preferred embodiment, the polyamide polymer is a high temperature engineering polyamide, defined by a melting temperature of at least 260° C. More preferable, the melting temperature is at least 270° C., even more preferable at least 280° C., and most preferably at least 290° C. The higher the melting temperature of the polyamide polymer, the more pronounced the effect of addition of the polyamide prepolymer in the melt-mixing process.

Also preferably, the polyamide prepolymer has a melting temperature of at most 20° C. above, more preferable at most 10° C. above to the melting temperature of the polyamide polymer, and even more preferable at most equal to the melting temperature of the polyamide polymer. The advantage of a polyamide prepolymer with a melting temperature that does not exceed the melting temperature of the polyamide polymer too much or even better with a melting temperature that does not exceed the melting temperature of the polyamide polymer at all, is that the processing temperature necessary for the melt-mixing process can be kept as low as or can even be reduced compared to the process without polyamide prepolymer.

The process according to the invention is in particular advantageously applied for preparing a flame retardant polyamide composition comprising a glass fibre reinforcing agent. Preparation of a glass fibre flame retardant polyamide composition comprising an antimony containing synergist agent generally suffers even more from deterioration of the mechanical properties, than non-reinforced compositions. With the process according to the invention flame retardant reinforced polyamide compositions can be prepared that show a substantial reduction in the negative effect of the synergist on the mechanical properties of the composition.

The invention also relates to the use of a flame retardant polyamide composition according to the invention for preparing a moulded part and to a moulded part obtainable by melt-processing of said composition. The moulded part according to the invention has the advantages of the composition according to the invention.

Suitable processes for preparing a moulded part according to the invention are, for example, melt-processes, like injection moulding, blow-moulding and pultrusion. The moulded part may be, for example, a film, a fiber, a sheet, a part for automotive use, or for electrical or electronic use. Examples of such parts include, for example, connectors and switches.

The invention will be further elucidated with reference to the following examples and comparative experiments, but is not limited thereto.

| Materials | |
|---|---|
| PA-A | Polyamide-4,6 polymer: Stanyl ® KS200: Mw = 36000, viscosity number (formic acid) = 160; $T_{melt}$ = 295° C.; (ex DSM, The Netherlands) |
| PA-B | Polyamide-6 polymer: Akulon K122, relative solution viscosity (formic acid) = 2.25 (ex DSM, The Netherlands) |
| PO-A | Polyamide-4,6 oligomer: $M_w$ = 2,000, $T_{melt}$ = 288° C. (ex DSM, The Netherlands) |
| AC540A | Lubricant (ex Allied, USA) |
| Glass fibres | Standard glass fibres for polyamide compositions; average fiber diameter 10 μm. |
| PDBS-80 | Polydibromostyrene (ex Great Lakes); Br content 59 wt. %. |
| AT-A | Antimone trioxide Bluestar RG (ex Campine, Belgium) containing 450 ppm lead; |
| AT-B | Antimone trioxide White Star CD (ex Campine, Belgium) containing 40 ppm lead |
| AT-C | Antimone trioxide White Star CS (ex Campine, Belgium) containing 70 ppm lead |

Determination of the Physical Properties

Viscosity number: determined in formic acid, according to ISO 307.

Relative viscosity: determinded in 1 mass % formic acid solution.

Molecular weight: determined with the aid of standard GPC techniques.

Melting point: determined with the aid of differencitial scanning calorimetry (DSC) (2nd run, 10° C./min.).

Tensile strength: determined at 23° C. and 5 mm/min, according to ISO 527.

Elongation at break: determined at 23° C. and 5 mm/min, according to ISO 527.

Notched Izod: determined at 23° C. according to ISO 180/1A.

Flame retardancy: determined according Underwriters Laboratories test method UL 94, using 0.8 mm test bars, conditioned for 48 hours at 23° C., 50% relative humidity, respectively for 168 hours at 70° C.

Lead content: determined by röntgenfluorescense (XRF).

Spiral flow length determined on spiral cavity with dimensions 280×15×1 mm at 315° C. temperature of the melt and at 80, 90 and 100 MPa effective injection pressures.

EXAMPLES I-II AND COMPARATIVE EXPERIMENTS A-B

Polyamide compositions according to Examples I-II and Comparative Experiments A-B, with compositions as reported in Table I, were prepared by melt-mixing the constituting components on a Werner & Pfleiderer ZSK-25 twin screw extruder using a 300° C. flat temperature profile. The constituents were fed via a hopper, glass fibers were added via a side feed. Throughput was 20 kg/h and screw speed was 275 rpm. The polymer melt was degassed at the end of the extruder. The melt was extruded into strands, cooled and chopped into granules.

The granules were injection moulded into test bars according to ISO 527/1A multipurpose specimens and UL 94 test bars of 0.8 mm thick. The test bars were used to measure the flame retardant properties and mechanical properties of the compositions. All products complied with a V0 rating in the UL 94 test. The results of the mechanical measurements have been reported in Table I.

TABLE I

Composition and results for Examples I-III and Comparative experiments A-B.

| | | Comparative experiment A | Comparative experiment B | Example I | Example II |
|---|---|---|---|---|---|
| Components | | | | | |
| PA-A | Wt % | 41 | 36.75 | 36.75 | 36.75 |
| PA-B | | 1.5 | 1.5 | 1.5 | 1.5 |
| PO-A | | — | 4.25 | 4.25 | 4.25 |
| Glass fibres | | 30 | 30 | 30 | 30 |
| AC540A | | 0.5 | 0.5 | 0.5 | 0.5 |
| PDBS 80 | | 21 | 21 | 21 | 21 |
| AT-A | | 6 | 6 | | |
| AT-B | | | | 6 | |
| AT-C | | | | | 6 |
| Spiral flow length: | | | | | |
| 80 MPa inj. press. | mm | 143 | 196 | 199 | 195 |
| 90 MPa inj. press. | mm | 154 | 208 | 209 | 206 |
| 100 MPa inj. press. | mm | 165 | 213 | 215 | 213 |
| Tensile strength | MPa | 182 | 177 | 191 | 189 |
| Elongation at break | % | 2.1 | 1.9 | 2.1 | 2.1 |
| Notched Izod | kJ/m$^2$ | 14.5 | 14.6 | 18.5 | 18.6 |

The invention claimed is:

1. Flame retardant polyamide composition, comprising a polyamide polymer, a polyamide prepolymer, a halogen containing flame retardant and an antimony containing synergist comprising less than 250 ppm lead.

2. Composition according to claim 1, wherein the polyamide polymer has a weight average molecular weight of at least 10,000 gl/mol and the polyamide prepolymer has a weight average molecular weight of at most 7,500 gl/mol.

3. Composition according to claim 1, wherein the polyamide prepolymer has a melting temperature at least 260° C.

4. Composition according to claim 1, wherein the polyamide prepolymer is present in an amount of 0.5-30 wt. % relative to the total weight of polyamide.

5. Composition according to claim 1, wherein the antimony containing synergist is chosen from the group consisting of antimony trioxide, antimony pentoxide, sodium antimonate and potassium antimonate.

6. Composition according to claim 1, wherein the antimony containing synergist comprises less than 150 ppm lead.

7. Composition according to claim 1, wherein the halogen containing flame retardant is a bromine containing polystyrene.

8. Composition according to claim 1, wherein the composition comprises a) 70-99 pbw polyamide polymer, b) 30-1 pbw polyamide prepolymer, whereby the sum of (a+b) amounts to 100, c) 1-100 pbw halogen containing flame retardant, d) 0.5-50 pbw antimony containing synergist, e) 0-200 pbw of a reinforcing agent, and 0-100 pbw of at least one other additive.

9. Process for preparing a composition according to claim 1 comprising melt-mixing of a polyamide composition comprising a polyamide polymer having a weight-average molecular weight of at least 10.000 gl/mol, a polyamide prepolymer having a weight-average molecular weight of at most 7500, and a halogen containing flame retardant, an antimony comprising synergist containing less than 250 ppm lead.

10. Process according to claim 9, wherein the polyamide polymer is a polyamide with a melting temperature of at least 260° C.

11. Process according to any of claims 9, wherein the polyamide prepolymer has a melting temperature of at most 20° C. above the melting temperature of the polyamide polymer.

12. Process according to claim 9, wherein the polyamide composition comprises a reinforcing agent.

13. A molded part comprising of a flame retardant polyamide composition according to claim 1.

* * * * *